United States Patent Office 3,451,856
Patented June 24, 1969

3,451,856
TETRAFLUOROETHYLENE-COATED CATALYTIC NONPOROUS METALLIC FUEL CELL ANODE AND PROCESS OF MAKING SAME
Edward O. Fraase, Woodstock, and Glenn A. Marsh, Crystal Lake, Ill., assignors, by mesne assignments, to Union Oil Company of California, Los Angeles, Calif., a corporation of California
No Drawing. Filed Jan. 28, 1965, Ser. No. 428,853
Int. Cl. H01m 27/06
U.S. Cl. 136—120         17 Claims This invention relates to a fuel cell electrode and a method for making the same and is particularly directed to the fabrication of nonporous, fluid-impermeable, catalytic electrodes utilizable as the fuel electrode of a fuel cell for the electrochemical oxidation of suitable fuels.

Typical of the fuels which may be employed in fuel cells embodying the anode of the present invention are, for example, hydrocarbons, alcohols, carbonyl compounds and the like and especially those types of reductants which have heretofore been successfully employed as fuels for the generation of electricity through the electrochemical process.

The invention constitutes an improvement in the formation of a nonporous electrode comprising a substrate fabricated of nonporous, metallic alloys such as Alloy 20, Hastelloy C and the various stainless steels wherein a catalytic metal is deposited on the surface of the nonporous, metallic substrate. The types of catalytic materials contemplated are those that have found wide acceptance in the prior art and have proved their ability to catalyze the electrochemical process in the direct generation of electrical energy. The invention, however, will have its greatest application in those embodiments wherein a solid anode utilizes a noble metal as the catalytic material.

While it is contemplated that the electrodes for most practical purposes will have the final form of rods, the invention is not so limited since the final form may be that of thin plates such as, for example, strips discs or screens.

With the unending quest for easier and more economical methods of generating electrical energy, the art has now been able to produce electrical energy through the direct oxidation of fuels, without the necessity of converting the fuel to heat energy, by means of an apparatus commonly referred to as a fuel cell. However, the art is also cognizant of the fact that in order to produce electrical energy through the electrochemical process, it has been necessary to utilize catalytic materials. Most of the catalytic materials, specifically the noble metals, have been found to improve the efficacy of the electrochemical process to such a point that the time when the fuel cell will replace the generator and storage battery for some purposes is within the forseeable future. Because some of these noble metal catalysts, such as platinum and palladium, are so expensive, ways and means of utilizing lesser amounts of these catalytic materials and means of preserving these materials on an electrode has necessitated continuing research for methods whereby catalytic materials deposited on a nonporous, metallic substrate could be mechanically protected without decreasing their catalytic affect upon the electrochemical oxidation of suitable fuels.

It has now been found that a superior fuel cell electrode, wherein an electrochemical catalyst is deposited on the surface of a nonporous, impermeable metal substrate, may have its mechanical strength and durability substantially increased by the placement of a thin film of tetrafluoroethylene resin on the surface of the electrode body.

Accordingly, it is an object of the present invention to provide a nonporous, solid type electrode which can be fabricated for use at the fuel side of a fuel cell.

It is another object of the invention to provide a solid type anode of high mechanical strength and durability, consisting of a nonporous, metallic substrate, upon which an electrochemical catalyst has been deposited.

It is another object of the invention to provide a fuel cell anode consisting of a nonporous, fluid-impermeable metal substrate, such as stainless steel, upon which has been electrolytically deposited a noble metal catalyst, such as platinum, over which a thin coating of tetrafluoroethylene resin is bonded onto the surface of the electrode body.

It is still another object of the invention to provide a method of fabricating mechanically durable fuel cell electrodes wherein the catalytic material deposited on a metallic substrate is prevented from flaking off.

These and other objects of the invention will become more apparent from the following detailed description.

Briefly, the objects of the instant invention are accomplished by providing a relatively thin film or coating of a tetrafloroethylene polymer on the surface of a plated electrode, which electrode has been plated with an electrochemical catalyst such that the thickness of the film or coating is sufficient to effectively bind the catalytic material to the metallic substrate but not capable of adversely affecting the catalytic properties of the catalytic compound deposited on the substrate. Obviously, the types of metallic substrates used in the fabrication of the novel fuel cell electrode are those nonporous, substantially fluid impermeable metals, passive in the anolyte, which have been heretofore proposed and successfully used in similar adaptations in the prior fuel cell art. These will generally be iron alloys containing nominally at least 16% chromium and 8% nickel. By way of nonlimiting examples may be mentioned stainless steel, such as types 304 and 316, Alloy 20 and Hastelloy C. Alloy 20 is a high grade stainless steel having a composition comprising 18–22% chromium, 21–31% nickel, 1.5% maganese and the remainder iron. Similarly, Hastelloy C is an alloy containing 54% nickel, 16% chromium, 16% molybdenum, 5% iron, 4% tungsten and the remainder minor constituents. Stainless steel 304 and 316 contain 18–20% chromium, 8–12% nickel, iron and minor constituents; and 16–18% chromium, 10–14% nickel, 2–3% molybdenum, iron and minor constituents, respectively. These alloy compositions, as well as others that may be suitable for use as the substrate, may be found in metallurgy handbooks and in Corrosion Resistance of Metals & Alloys, 2nd ed., by LaQue and Copson (Reinhold, 1963). The exact dimensions and shape of the substrate are not important in that, as has been heretofore pointed out, the finished electrode body may take any configuration consistent with its utilization in a fuel cell.

The catalyst employed with the nonporous, metallic substrate and fluorocarbon coating of this invention, may be any of the catalytic materials heretofore successfully demonstrated in the art to be adapted and suitable for the catalysis of the electrochemical process at the fuel side of the fuel cell or anode.

Thus, the catalyst may be a metal of Groups I–B, V–B, VI–B and VIII of the Periodic Table, mixtures of such elements, and inorganic compounds containing at least one of such elements and oxygen. Catalysts employed at the anode include Pt, Ni, Co, $Cr_2O_3$, Rh, Pd, $V_2O_5$, $MoS_2$, $WS_2$, Au, Ag, MnO, $MnMoO_4$ and $CoMoO_4$. Of these, noble metals such as a palladium and platinum are preferred.

While various means may be utilized by which to deposit the catalytic material on the surface of the metallic substrate, it is preferred to electrolytically deposit the catalytic material or metal catalyst on the substrate. The means by which a metal may be electrolytically deposited on another metal are well known in the art and will not be delved into herein inasmuch as this subject is outside the scope of this invention.

Ideally, but not necessarily, the metallic substrate should be suitably cleansed so as to remove all foreign material from the surface thereof so as to more readily facilitate the depositing of the catalytic material thereon. However, if the metal is already in a suitably uncontaminated condition, the metallic substrate need not be treated prior to receiving the deposit of the catalytic metal. One method of removing contaminants from the surface of the metallic substrate comprises treating the metallic substrate with an etchant composed of glycerol and nitric acid. Following this treatment, which while preferred is not necessarily, the metallic substrate is washed to remove the etchant and is then ready for the depositing of the catalytic material thereon. One means of depositing the electrochemical catalyst comprises the preferred method of electrolytically depositing by means of electrolytic decomposition of a salt containing the metal to be deposited. By way of example only, the metallic substrate may be disposed in a 3% plating solution of $H_2PtCl_6$ and subjected to a current density of 100 ma./cm.$^2$ for a time period of approximately 10 minutes. The layer of platinum deposited on the metallic substrate will normally contain about 2 to 50 milligrams of platinum per square centimeter of the substrate. It will be readily appreciated that concentrations of the plating solutions as well as current density and time periods utilized will vary depending upon the type of catalytic material which is to be deposited on the metallic substrate. Ordinarily, when utilizing expensive electrochemical catalysts, such as palladium and platinum, it will be desirable to form as thin a layer of catalytic material on the substrate as possible consistent with those concentrations needed to provide effective catalytic activity to the anode.

The film or coating of tetrafluoroethylene resin applied to the metallic substrate, on which has been deposited an electrochemical catalyst, is a polymerized tetrafluoroethylene compound known as polytetrafluoroethylene or commercially as "Teflon." The polymerization of tetrafluoroethylene is a process which is well known in the art and one method of carrying out the polymerization may be found in Polymers and Resins, authored by Golding, and published by D. Van Nostrand Co., Inc., 1959. Preferably, the plated electrode is dipped into an aqueous emulsion of the polytetrafluoroethylene wherein the concentration of the polymer is about 0.1 weight percent to 10 weight percent of the emulsion with the preferred range being about 0.2 weight percent to 1 weight percent. The plated metallic substrate is merely immersed in the polytetrafluoroethylene emulsion for a sufficient time to permit the adhesion and cohesion of the polymer to form a film or coating. The time period may be one second or longer. Ordinarily, a period of immersion from about 1 to 60 seconds is sufficient to provide an adequate film or coating. The film will generally contain about $10^{-5}$ to $10^{-3}$ gm. of the polytetrafluoroethylene per cm.$^2$ of the fabricated electrode. Thereafter, the coated electrode is subjected to a drying process for a time sufficient to allow the water from the emulsion to evaporate to thereby set the film or coating firmly on the electrode body. Ordinarily, the time of drying is as little as 30 minutes to a maximum of about 24 hours at a temperature of about 180–250° F. The time of drying is not critical in that the longer drying periods will not act adversely upon the coated electrode body. However, it is important that the time and temperature be compatible in order to allow the polymer sufficient time to set and bind upon the plated metallic substrate. While it is not essential that any special precautions be taken during the drying period, it is preferred that the drying process be carried out in an atmosphere which is inert and chemically nonreactive to the polytetrafluoroethylene resin, catalytic material or metallic substrate. A preferred atmosphere of nitrogen has been found to produce extremely good results but the use thereof is not absolutely essential.

The anode made in accordance with this invention was tested in a fuel cell using methanol as the anodic fuel and it was found that the polytetrafluoroethylene coating or film, while preventing the deposited electrochemical catalytic metal from flaking off of the nonporous, metallic substrate, did not affect, appreciably, the activity of the anode. Specifically, an anode was fabricated according to the embodiments of this invention utilizing the hereinafter described procedure.

One end of a rod of type 316 stainless steel, of 0.5 cm. diameter was immersed in a 3% solution of $H_2PtCl_6$ to a depth sufficient to cover 2 cm.$^2$ of the rod. The rod was then electroplated at a current density of 100 ma./cm.$^2$ for 5 minutes to provide a catalytic surface of platinum. The plated rod was then removed from the plating solution and rinsed in water. Thereafter it was dipped into a 0.2% emulsion of "Teflon" in water for 10 seconds and allowed to drain for 10 seconds. Thereafter, the coated electrode was heated at 220° F. for one hour to form a film of the "Teflon" on the plated electrode body.

Another electrode was fabricated according to the foregoing procedure except for the application of the film or coating of polytetrafluoroethylene in order to compare the anode of this invention with a prior art anode.

The efficiency test of the coated and uncoated electrodes comprised their separate utilization as an anode in a test fuel cell. The procedure consisted in operating both the coated and uncoated electrodes as anodes in a fuel cell. The anolyte was 0.67 M $H_3PO_4$ containing 4.5 M methanol. Both the uncoated and "Teflon" coated electrodes were capable of delivering .22 volt (vs. saturated calomel) at a current density of 100 ma./cm.$^2$. After several minutes some of the platinum flaked off the uncoated anode, resulting in a loss of catalytic activity. However, no platinum flaked off the coated anode. From the foregoing results, it is readily apparent that the anode constructed in accordance with the embodiments of the hereindisclosed invention was mechanically stable, was easily handled and was much more durable than the anode which did not have the film or coating of polytetrafluoroethylene applied thereto. In addition, the electrochemical activity characteristics of the coated anode were essentially unchanged.

The illustrative example is given as preferred embodiments of the invention; however, the invention is not to be construed as limited thereby. It is possible to produce still other embodiments without departing from the inventive concept herein-described and such embodiments are within the ordinary ability of one skilled in the art.

The embodiments of the invention in which an exclusive property or privilege is claimed are defined as follows:

We claim:
1. In the method of preparing a fuel cell electrode wherein an electrochemical catalyst is electrolytically deposited on the surface of a nonporous, impermeable, metal substrate, the improvement in combination therewith which consists essentially of coating the thus formed catalyst-substrate combination with a thin film of tetrafluoro-ethylene resin, the thickness of said film being sufficiently small so as not to affect the catalytic properties of said electrochemical catalyst deposited on said substrate and said film containing about $10^{-5}$ to $10^{-3}$ gm. of resin per cm.$^2$ of the electrode, whereby the adhesion of said electrochemical catalyst to said substrate is improved.

2. The method according to claim 1 wherein said substrate is an iron alloy metal, passive in an anolyte, containing not less than 16% chromium and 8% nickel.

3. The method according to claim 2 wherein said iron alloy metal is stainless steel.

4. The method according to claim 2 wherein said iron alloy metal is Alloy 20 having a composition comprising 18–22% chromium, 21–31% nickel, 1.5% manganese and the remainder iron.

5. The method according to claim 2 wherein said iron alloy metal is Hastelloy C having a composition comprising 54% nickel, 16% chromium, 16% molybdenum, 5% iron, 4% tungsten and the remainder minor constituents.

6. The method according to claim 3 wherein said film is applied to the catalyst-substrate combination by dipping said combination in an aqueous emulsion of said tetrafluoroethylene resin for a period of time of about 1 second to 60 seconds inclusive, the concentration of said resin in said emulsion being about 0.1 weight percent to 10 weight percent, inclusive, of the total weight of said emulsion.

7. The method according to claim 6 wherein said resin is polymerized tetrafluoroethylene.

8. The method according to claim 7 which additionally includes drying the dipped electrode in an atmosphere inert to said electrode for about ½ to 2 hours at a temperature of about 180–250° F.

9. The method according to claim 8 wherein said atmosphere consists essentially of nitrogen.

10. The method in accordance with claim 9 wherein said electrochemical catalyst is a noble metal.

11. The method of fabricating a fuel cell electrode which consists essentially of the steps of:
  (a) electroplating platinum on a passive chrome-nickel-iron alloy non-porous substrate, said platinum being deposited on said substrate from a 3% plating solution of $H_2PtCl_6$ at a current density of 100 ma./cm.$^2$ for a time period of approximately 10 minutes;
  (b) cleansing said substrate of plating solution with a solvent in which said solution is soluble whereby said substrate is substantially cleansed of said solution;
  (c) dipping the plated substrate in an aqueous emulsion of polymerized tetrafluoroethylene resin, the concentration of said resin in said aqueous emulsion being 0.1 weight percent to 10 weight percent, for a time sufficient for said resin to form a film coating on said plated substrate including the platinum; and
  (d) drying said coated, plated substrate in a nitrogen atmosphere at a temperature of about 200° F. for about one hour.

12. The method in accordance with claim 11 wherein said substrate is first treated with a glycerol and nitric acid mixture to remove contaminants from said substrate and then washed to remove the mixture from said substrate prior to said electroplating step.

13. An anode for a fuel cell consisting essentially of a noble metal catalyst deposited on a nonporous, impermeable metal substrate and a thin coating of tetrafluoroethylene resin bonded onto the outer surface of the noble metal deposit.

14. The anode in accordance with claim 13 wherein the noble metal deposit contains 2 to 50 mg. of metal per cm.$^2$ of the electrode.

15. The anode in accordance with claim 14 wherein said substrate is an alloy, passive in anolyte, containing not less than 16% chromium and 8% nickel.

16. The anode in accordance with claim 15 wherein said resin is polytetrafluoroethylene and said coating contains about $10^{-5}$ to $10^{-3}$ gm. of resin per cm.$^2$ of said electrode.

17. The anode in accordance with claim 16 wherein said noble metal is selected from the group consisting of platinum and palladium.

References Cited

UNITED STATES PATENTS

| | | | |
|---|---|---|---|
| 3,113,048 | 12/1963 | Thompson | 136—120 X |
| 3,103,446 | 9/1963 | FitzSimmons | 117—75 |
| 3,215,562 | 11/1965 | Hindin | 136—120 X |
| 3,284,240 | 11/1966 | Kring | 136—120 |
| 3,288,653 | 11/1966 | Holt et al. | 136—120 |
| 3,291,753 | 9/1963 | Thompson | 136—86 X |
| 3,080,440 | 5/1963 | Ruetschi et al. | 136—86 X |
| 3,097,974 | 7/1963 | McEvoy et al. | 136—120 |
| 3,203,834 | 8/1965 | Breiner | 136—120 X |
| 3,297,482 | 1/1967 | Zimmer | 136—86 |

OTHER REFERENCES

The Condensed Chemical Dictionary, sixth edition, 1961, Rheinhold Publishing Corp., New York, N.Y., page 540 relied on.

ALLEN B. CURTIS, *Primary Examiner.*

O. F. CRUTCHFIELD, *Assistant Examiner.*

U.S. Cl. X.R.

204—038